United States Patent
Shimizu (10) Patent No.: US 9,954,766 B2
(45) Date of Patent: Apr. 24, 2018

(54) CENTRALIZED NETWORK CONTROL SYSTEM

(71) Applicant: FUJITSU LIMITED, Kawasaki-shi, Kanagawa (JP)

(72) Inventor: Sho Shimizu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 81 days.

(21) Appl. No.: 14/092,100

(22) Filed: Nov. 27, 2013

(65) Prior Publication Data

US 2014/0198662 A1 Jul. 17, 2014

(30) Foreign Application Priority Data

Jan. 16, 2013 (JP) .................. 2013-005360

(51) Int. Cl.
*H04L 12/733* (2013.01)
*H04L 12/725* (2013.01)
*H04L 12/753* (2013.01)
*H04L 12/801* (2013.01)

(52) U.S. Cl.
CPC ............ *H04L 45/122* (2013.01); *H04L 45/48* (2013.01); *H04L 45/302* (2013.01); *H04L 47/127* (2013.01)

(58) Field of Classification Search
CPC ..... H04L 45/122; H04L 45/302; H04L 45/48; H04L 47/127
See application file for complete search history.

(56) References Cited

U.S. PATENT DOCUMENTS 6,400,681 B1 6/2002 Bertin et al.
7,567,512 B1 * 7/2009 Minei et al. .................. 370/232
8,412,773 B1 * 4/2013 Chapweske ............ H04N 7/155 709/203
2003/0187978 A1 * 10/2003 Nakamura .............. H04L 29/06 709/224
2005/0027948 A1 * 2/2005 Marlan ................. G06F 9/3824 711/150
2005/0058069 A1 * 3/2005 Dauchy .................. H04L 45/00 370/230
2006/0221821 A1 * 10/2006 Martinez Ransom ................ H04W 28/02 370/229

(Continued)

FOREIGN PATENT DOCUMENTS

JP 10-70571 3/1998
JP 2004-172708 6/2004

(Continued)

OTHER PUBLICATIONS

E. W. Dijkstra, "A Note on Two Problems in Connexion with Graphs", Numerische Mathematik, vol. 1, pp,1959.

(Continued)

*Primary Examiner* — Parth Patel
*Assistant Examiner* — Kai Chang
(74) *Attorney, Agent, or Firm* — Staas & Halsey LLP (57) ABSTRACT

A centralized network control device for controlling a plurality of network devices in a centralized manner includes a processor configured to determine a load state of path calculation based on a predetermined threshold value when a path setting request is received, and perform, when a heavy load state of the path calculation is determined, setting control for a temporary path by using a path based on a path tree obtained by past path calculation execution.

19 Claims, 7 Drawing Sheets

(56) References Cited

U.S. PATENT DOCUMENTS

| | | | | |
|---|---|---|---|---|
| 2007/0248017 | A1* | 10/2007 | Hinata | G06F 3/061 370/238 |
| 2009/0271526 | A1* | 10/2009 | Watanabe | H04L 67/2819 709/236 |
| 2010/0061272 | A1* | 3/2010 | Veillette | 370/254 |
| 2010/0211981 | A1* | 8/2010 | Shaul | H03M 7/30 725/87 |
| 2011/0164503 | A1* | 7/2011 | Yong | H04L 69/22 370/237 |
| 2011/0228781 | A1* | 9/2011 | Izenberg | H04L 45/60 370/392 |
| 2013/0121157 | A1* | 5/2013 | Logvinov et al. | 370/238 |
| 2013/0250799 | A1 | 9/2013 | Ishii | |
| 2013/0329601 | A1* | 12/2013 | Yin et al. | 370/254 |
| 2014/0003247 | A1* | 1/2014 | Zheng | H04L 43/0882 370/237 |
| 2014/0153443 | A1* | 6/2014 | Carter et al. | 370/256 |
| 2014/0328179 | A1* | 11/2014 | Kabakura | H04L 45/38 370/235 |

FOREIGN PATENT DOCUMENTS

| | | |
|---|---|---|
| JP | 2005-94222 | 4/2005 |
| JP | 2006-74126 | 3/2006 |
| JP | 2012-15837 | 1/2012 |
| WO | 2012/077259 A1 | 6/2012 |

OTHER PUBLICATIONS

George T. Heineman et al, "Algorithms in a Nutshell", pp. 159-166, O'Reilly, Oct. 2008.

Dijkstra, E.W., *A Note on Two Problems in Connexion with Graphs*, Numerische Mathematik, vol. 1, 1959, pp. 269-271.

Japanese Office Action dated Feb. 16, 2016 in related Japanese Application No. 2013-005360.

Koji Sugisono et al., "A study of high-speed path computation scheme of functionally-distributed transport networking", B-6-132, 2009 IEICE General Conference, Mar. 4, 2009, pp. 132.

Yuta Watanabe et al., "A study of accommodating methods for on-demand communications considering network resource reservations", vol. 106, No. 281, pp. 13-18, IEICE Technical Report, The Institute of Electronics Information and Communication Engineers, Oct. 5, 2015.

\* cited by examiner

31 FLOW TABLE

| INPUT PORT NUMBER | TRANSMITTING NODE ID | DESTINATION NODE ID | OUTPUT PORT NUMBER |
|---|---|---|---|
| 1 | 3 | 5 | 2 |
| 1 | 3 | 7 | 3 |
| ... | ... | ... | ... |
| 3 | 1 | 7 | 4 |

CENTRALIZED NETWORK CONTROL SYSTEM

CROSS-REFERENCE TO RELATED APPLICATION

This application is based upon and claims the benefit of priority of the prior Japanese Patent Application No. JP2013-005360, filed on Jan. 16, 2013, the entire contents of which are incorporated herein by reference.

FIELD

The disclosures made herein relate to a centralized network control system.

BACKGROUND

In recent years, a software defined network (SDN) related technology represented by OpenFlow has been drawing attention in a network field. In OpenFlow, a packet-format data forwarding function and a control function such as switching and routing, which are included in conventional network devices such as a switch and a router, are separately provided to a switch (OpenFlow switch) and a controller (OpenFlow controller).

The OpenFlow controller controls data forwarding performed by the OpenFlow switch in accordance with the OpenFlow protocol. In other words, in OpenFlow, the controller controls a plurality of switches existing in a network in a centralized manner. Unlike conventional network control, in OpenFlow, in order to allow communications between two communication nodes, the controller needs to determine an optimal path and set (distribute) the flow table for (to) the switches existing on the path. Note that, in the same manner as in the conventional network control, the controller can calculate the shortest path based on a Dijkstra's algorithm (Single Source Shortest Path Algorithm).

Further, recent development of cloud computing allows a user to boot virtual machines (VMs) as an infrastructure, as many as necessary when needed. For example, Amazon (trademark) and Google (trademark) provide Infrastructure as a Service (IaaS) being a service that lends a machine resource such as a server environment in units of VMs.

The following are related arts to the invention.
[Patent document 1] Japanese Patent Laid-Open Publication No. JP 2005-94222
[Non-patent document 1] E. W. Dijkstra, "A Note on Two Problems in Connextion with Graphs", Numerische Mathematik, Vol. 1, pp. 269-271, 1959
[Non-patent document 2] George T. Heineman et al, "Algorithm Quick References", pp. 169-177, O'Reilly, April 2010

SUMMARY

In consideration of a case where a centralized network control technology such as OpenFlow is applied to IaaS, in a stage in which a VM is deployed, the network needs to have connectivity to this VM. The controller needs to calculate the shortest path, in which a VM to be deployed is set as a transmission source or a destination, and set the flow tables necessary for the switches along the path.

In a case where a large number of VMs are deployed at a time in a large-scale network that implements IaaS, a large number of path setting requests regarding those VMs are issued in order to secure the connectivity of the network to those VMs. In this case, the controller needs to process a large volume of path calculation in a short time, which increases a path calculation load. Therefore, it is unavoidable that a delay time until the path is set becomes longer than usual.

According to an aspect of the disclosures made herein, a centralized network control device for controlling a plurality of network devices in a centralized manner includes a processor configured to determine a load state of path calculation based on a predetermined threshold value when a path setting request is received, and perform, when a heavy load state of the path calculation is determined, setting control for a temporary path by using a path based on a path tree obtained by past path calculation execution.

DESCRIPTION OF EMBODIMENTS

An embodiment of the disclosures made herein will be described below referring to the drawings in detail. The drawings illustrate a preferred embodiment. It should be understood, however, that the embodiment can be implemented by many different embodiments, and is not limited to the embodiment described herein.

[Centralized Network Control System]

Figure 1:
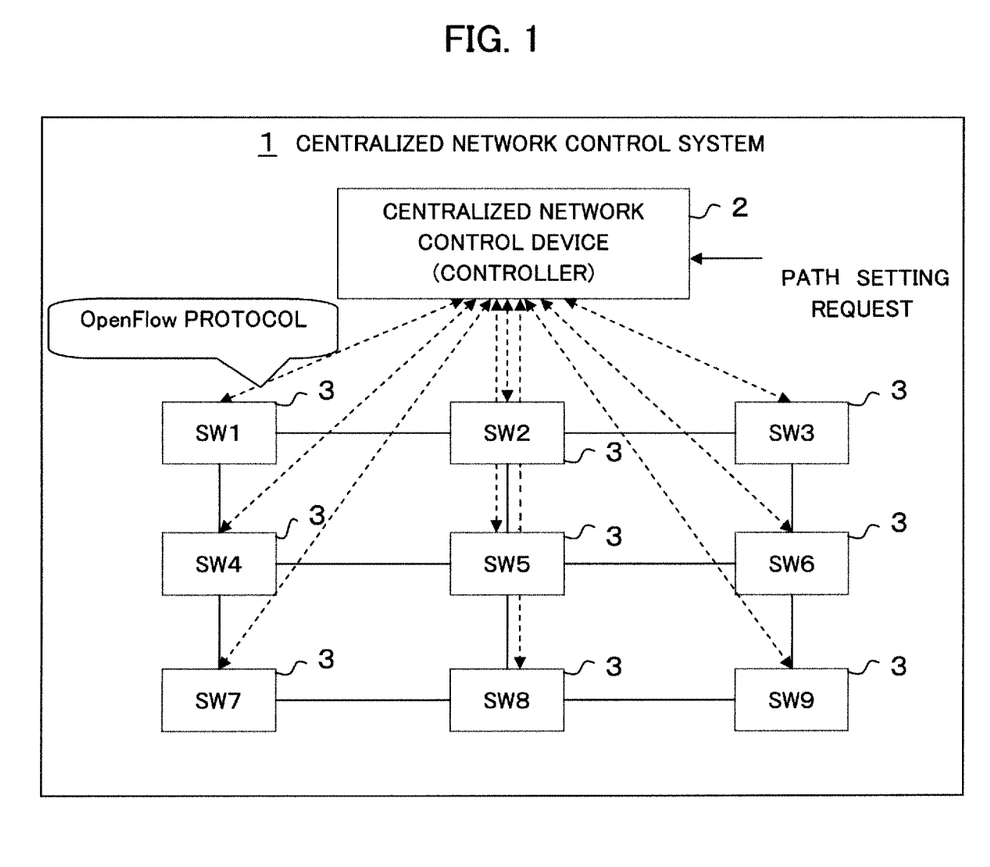
FIG. 1 is a block diagram illustrating a configuration of a centralized network control system according to an embodiment.

Referring to FIG. 1 illustrating a system configuration according to an embodiment, a centralized network control system 1 includes a centralized network control device 2 and switches 3 serving as a plurality of network devices that form a communication network NW. Here, for the sake of simplicity, nine switches (SW1 to SW9) 3 that form at least one communication network NW are illustrated as an example. Those switches 3 may be any one of an L2 (layer 2) switch, an L3 (layer 3) switch, a router, and the like.

In the embodiment, the centralized network control device 2 is an OpenFlow controller, and in accordance with the OpenFlow protocol, sets (distributes) a flow table for (to) the nine switches (OpenFlow switches) 3 to control the nine switches 3 in a centralized manner.

(Centralized Network Control Device)

Figure 2:
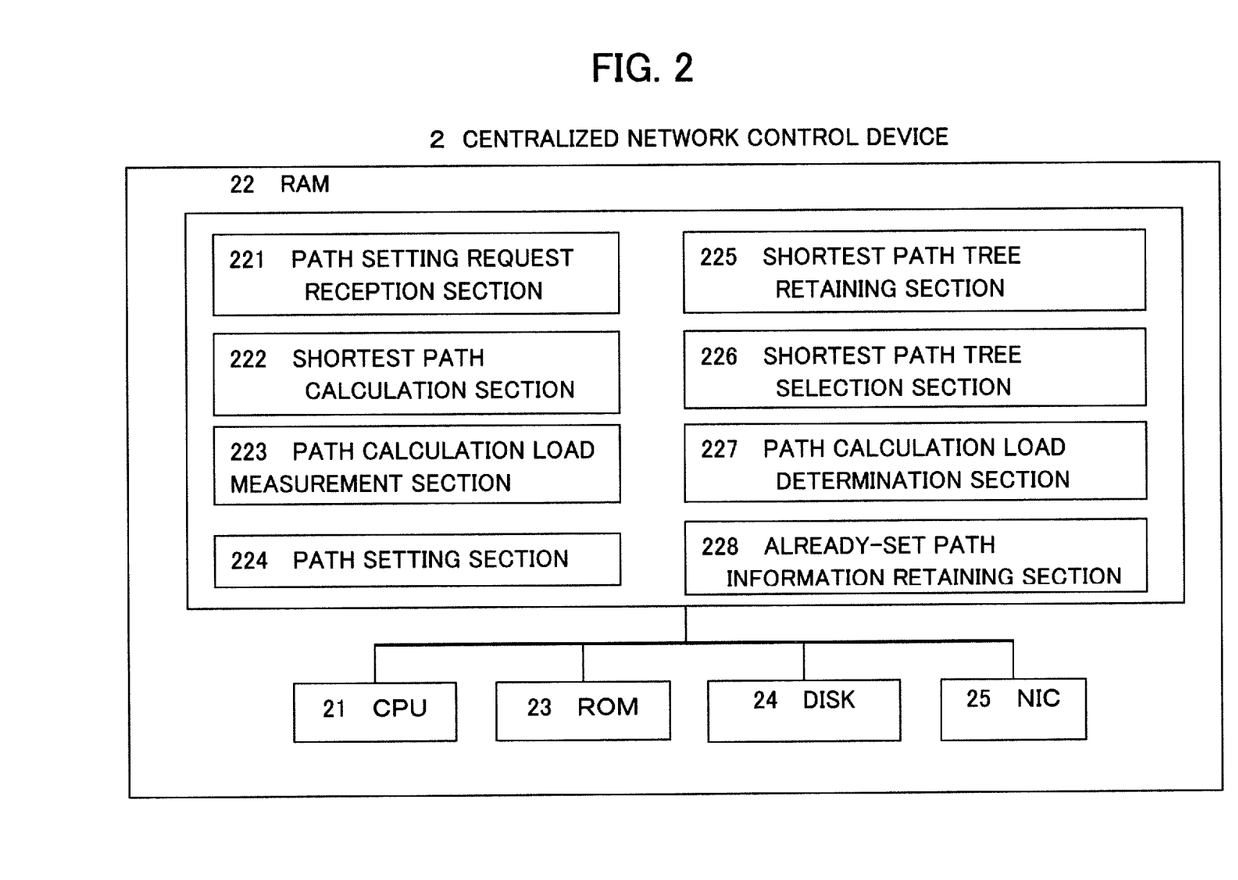
FIG. 2 is a block diagram illustrating a configuration of a centralized network control device illustrated in FIG. 1.

The centralized network control device (hereinafter also referred to simply as "controller") 2 includes the following components as hardware components as illustrated in FIG. 2. In other words, the centralized network control device 2 includes a central processing unit (CPU) 21 serving as a processor, a random access memory (RAM) 22 serving as a work memory, and a read only memory (ROM) 23 that stores a boot program for booting.

Further, the centralized network control device 2 includes a disk 24 serving as a nonvolatile flash memory that stores an operating system (OS), various application programs, and various kinds of information (including data) in a rewritable manner and a network interface card (NIC) 25 serving as a communication interface.

In order to logically realize a path setting processing function described later in detail, on the centralized network control device 2, a control program (SDN control program) is previously installed in the disk 24 as the application program. Then, on the centralized network control device 2, the CPU 21 expands the control program in the RAM 22 at all times to execute the control program as a resident program.

For further details, the centralized network control device 2 includes, as functional components, a path setting request reception section 221, a shortest path calculation section 222, a path calculation load measurement section 223, a path setting section 224, a shortest path tree retaining section 225, a shortest path tree selection section 226, a path calculation load determination section 227, and an already-set path information retaining section 228.

The path setting request reception section 221 receives a path setting request issued from outside the centralized network control device 2 via the NIC 25. The path setting request is issued from an upper application layer or the like in order to secure connectivity of the communication network NW to a virtual machine (VM) in a case where, for example, the virtual machine is deployed in order to implement IaaS being a service that lends a machine resource such as a server environment. The path setting request includes identification information on a transmission source communication node and identification information on a destination communication node.

The shortest path calculation section 222 calculates a shortest path tree that sets one communication node (hereinafter also referred to simply as "node") compatible with the virtual machine to be deployed, which is given along with the path setting request, as the first node, in other words, a starting point (root), within a path tree. In order to calculate the shortest path tree having such a single starting point, the shortest path calculation section 222 can use, for example, the Dijkstra's algorithm (single source shortest path algorithm) (see, for details, the non-patent document 2).

The path calculation load measurement section 223 measures a degree of load imposed by path calculation being currently executed on the centralized network control device 2. In order to realize the path determined by path setting processing described later in detail, the path setting section 224 sets and distributes the flow table (described later in detail) for and to the switch 3.

The shortest path tree retaining section 225 stores the shortest path tree and a shortest path tree candidate that are obtained when the shortest path calculation section 222 calculates the shortest path. The shortest path tree selection section 226 selects the shortest path tree candidate to be retained in the shortest path tree retaining section 225 from among a plurality of shortest path tree candidates already retained in the shortest path tree retaining section 225 and the newly-obtained shortest path tree. Further, when a path calculation load is heavy, the shortest path tree selection section 226 selects the shortest path tree to be used from among a plurality of shortest path tree candidates.

By comparing the path calculation load with a predetermined threshold value based on path calculation load information obtained by the path calculation load measurement section 223, the path calculation load determination section 227 determines whether the path calculation load is heavier or lighter. The already-set path information retaining section 228 stores path information already set between two communication nodes.

On the above-mentioned centralized network control device 2, when the path setting request is issued, it is determined whether the path calculation load at a time of the issuance is heavier or lighter than the predetermined threshold value. When it is determined that the path calculation load is lighter, on-demand path calculation (in other words, path calculation on a per path setting request basis) is performed to perform path setting based on a calculation result thereof. On the other hand, when it is determined that the path calculation load is heavier, a result of the path calculation performed in the past (including immediately before) is used (reused) to perform temporary path setting. Further, when the path calculation load changes from a heavy state to a light state, the path setting is changed from the temporarily set path to the path obtained by the on-demand path calculation.

(Switch)

Each of the switches 3 illustrated in FIG. 1 includes, as hardware components, a CPU serving as a processor, a RAM serving as a work memory, and a ROM that stores a boot program for booting. Further, each of the switches 3 includes a disk serving as a nonvolatile flash memory that stores an OS, various application programs, and various kinds of information (including data) in a rewritable manner and a NIC serving as a communication interface. Those hardware components can be easily understood and carried out by a person skilled in the art, and hence illustrations of the components are omitted here from the drawings.

In order to logically realize a packet-format data forwarding function provided separately from network control carried out by the centralized network control device 2, on each of the switches 3, the control program is previously installed in the disk as the application program. On each of the switches 3, with a trigger when an instruction is received from the centralized network control device 2, the CPU expands the control program in the RAM to execute the control program. With this arrangement, on each of the switches 3, a switching operation is performed based on the path information set in a flow table 31 shown in FIG. 3 to realize the determined path.

Figure 3:
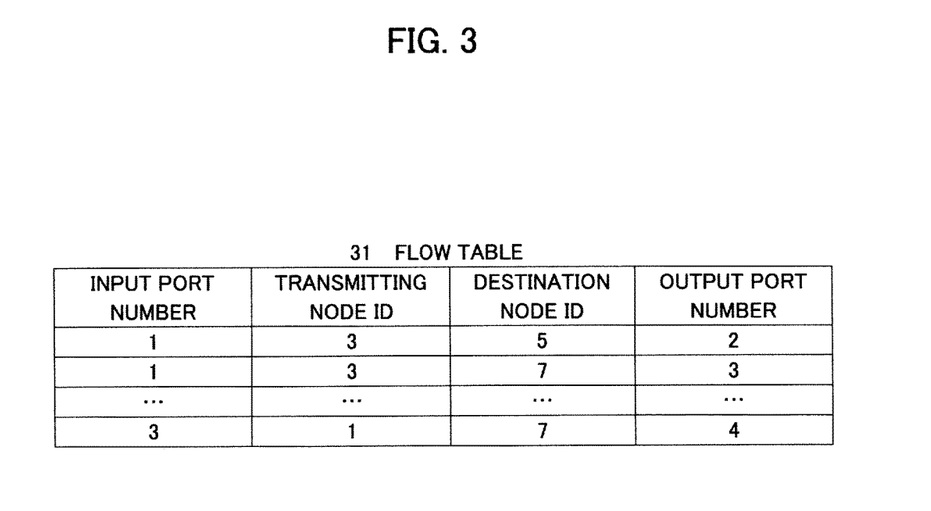
FIG. 3 shows a structure of a flow table.

Referring to FIG. 3, the flow table 31 is a table in which a forwarding rule for a packet is described, and contents are added, deleted, or updated based on the instruction received from the centralized network control device 2. The flow table 31 stores an input port number of the switch 3, transmitting (transmission source) node identification information (ID), destination node identification information (ID), and an output port number of the switch 3 in association with one another.

On each of the switches 3, the flow table 31 is referred to and searched for a record having the input port number, the transmitting node ID, and the destination node ID matching those of the input packet (managed packet), and the packet to be forwarded is output to an output port corresponding to the output port number of the record. The example of the first record (first row) of the flow table 31 shows that the packet having a transmitting node ID of "3" and a destination node ID of "5", which is input from the input port number "1" of the switch 3, is output to the output port number "2" of the switch 3.

Here, each of the transmitting node ID and the destination node ID may be not only an Internet protocol (IP) address obtained from a header part of the packet to be forwarded but also any piece of identification information that can identify each communication node such as a media access control (MAC) address. Further, each of the transmitting node ID and the destination node ID may be expressed by a combination of a plurality of pieces of identification information which covers both the IP address and the MAC address. In addition, one of the transmitting node ID and the destination node ID may be a wildcard.

[Operation]

Next, an exemplary operation of the centralized network control system 1 according to the embodiment illustrated in FIG. 1 is described with reference to the related figures.

(Basic Path Setting Processing)

First, a first path setting processing of the controller 2 is described.

Figure 4:
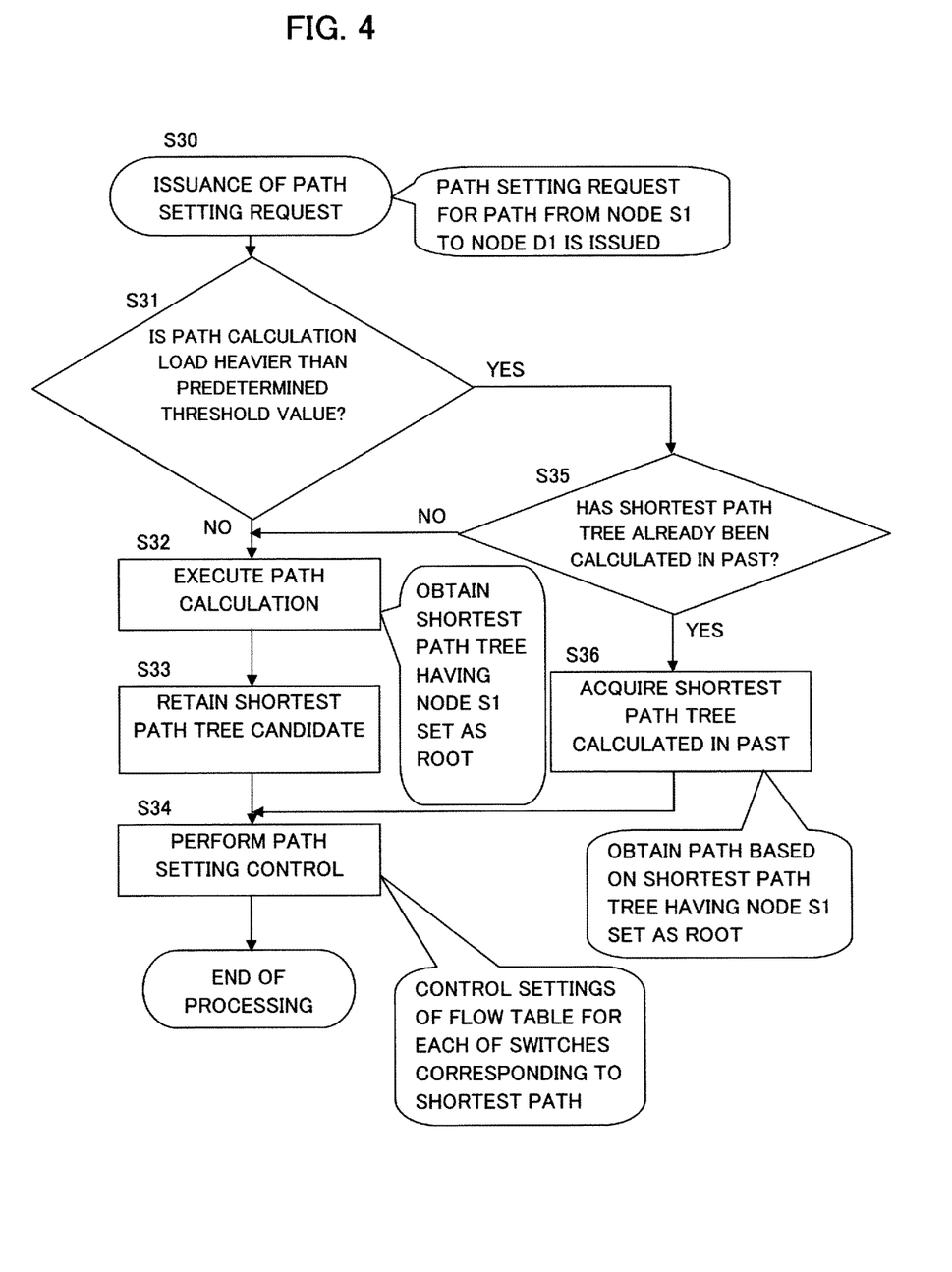
FIG. 4 is a flowchart illustrating a first path setting processing.

On the controller 2, when a path setting request for a path from the node S1 to the node D1 is issued from outside, the path setting request reception section 221 receives the path setting request via the NIC 25 (S30 in FIG. 4).

By comparing the path calculation load of the own device with the predetermined threshold value based on the path calculation load information obtained by the path calculation load measurement section 223, the path calculation load determination section 227 determines whether or not the path calculation load of the own device is heavier (S31 in FIG. 4).

When it is determined that the path calculation load is not heavier (in other words, is lighter), the shortest path calculation section 222 executes the path calculation to obtain the shortest path tree having the node S1 set as the root (S32 in FIG. 4).

When the path calculation is executed by the shortest path calculation section 222, the shortest path tree retaining section 225 retains (saves) the shortest path tree candidate obtained in the path calculation along with the shortest path tree (S33 in FIG. 4). Here, the shortest path tree candidate and the shortest path tree are retained because the shortest path tree candidate and the shortest path tree calculated in the past are used when it is determined in the processing of S31 that the path calculation load is heavier.

For example, on the assumption that the shortest path tree retaining section 225 retains n shortest path trees at the maximum, when the number of shortest path trees currently retained is less than n, the shortest path tree retaining section 225 retains the shortest path tree newly calculated by the shortest path calculation section 222. On the other hand, when the shortest path tree retaining section 225 already retains n shortest path trees, it is necessary to select n shortest path trees from among (n+1) shortest path trees including the newly-calculated one shortest path tree. It is described later in detail how the shortest path tree selection section 226 selects n candidates at this time.

The path setting section 224 controls the path setting based on the shortest path tree obtained by the shortest path calculation section 222. In other words, the path setting section 224 sets the path by controlling settings of the flow table 31 for each of the switches 3 corresponding to the shortest path from the node S1 to the node D1 based on the obtained shortest path tree (S34 in FIG. 4). This brings the path setting processing, which is performed when it is determined that the path calculation load is lighter, to an end.

On the other hand, when it is determined in the processing of S31 that the path calculation load is heavier, the shortest path tree retaining section 225 refers to the saved contents to determine whether or not the shortest path tree has already been calculated in the past for the path to be set from the node S1 to the node D1 (S35 in FIG. 4).

When the shortest path tree retaining section 225 determines that the shortest path tree has not yet been calculated in the past, the shortest path calculation section 222 executes normal path calculation (S32 in FIG. 4). This brings the path setting processing to an end after the shortest path tree and the shortest path tree candidate are retained in S33 and the path setting control is performed in S34 as described above.

Further, when the shortest path tree retaining section 225 determines that the shortest path tree has already been calculated in the past, an already-calculated shortest path tree is acquired (S36 in FIG. 4). This brings the path setting processing to an end after the path setting control is performed in S34 as described above. The path setting using the shortest path tree calculated in the past is described later in detail.

Next, path calculation execution processing performed in S32 and retaining processing for the shortest path tree and the shortest path tree candidate performed in S33 are described in more detail.

When the path setting request for the path from the node S1 to the node D1 is issued, and when it is determined that the path calculation load is lighter, the shortest path calculation section 222 obtains the shortest path tree having the node S1 set as the root in the path calculation execution processing of S32.

Figure 5:
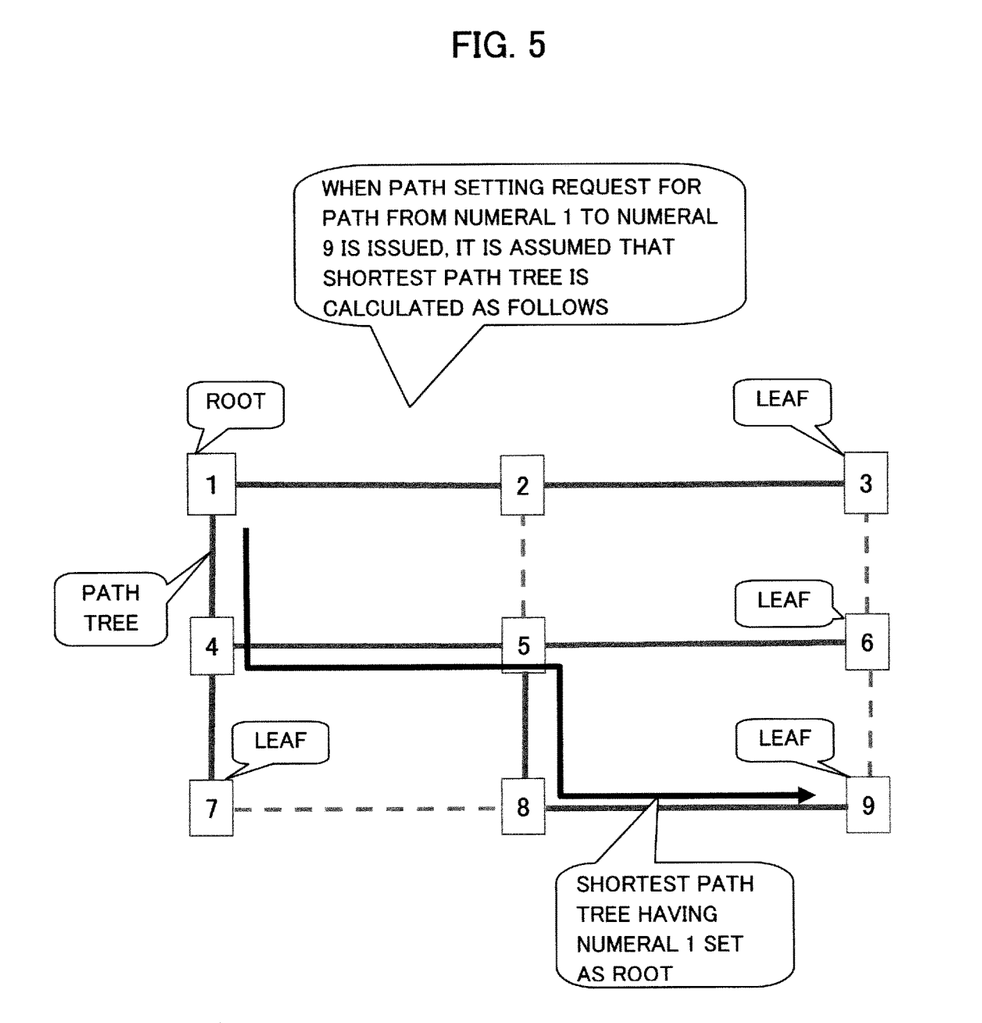
FIG. 5 is an explanatory diagram of path trees.

As a result of the path calculation, for example, as illustrated in FIG. 5, the shortest path tree passing through numerals 4, 5, and 8 with numeral 1 and numeral 9 set as the root (starting point) and a terminal point (leaf), respectively, is obtained.

Further, as a result of the path calculation, a path tree including numerals 1, 2, and 3, a path tree including numerals 1, 4, 5, and 6, and a path tree including numerals 1, 4, and 7 are obtained together. Those path trees are retained as candidates for the shortest path tree having numeral 1 set as the root along with the shortest path tree including numerals 1, 4, 5, 8, and 9 in the processing of S33 described above.

Note that, the processing of S32 and S33 is also executed in the same manner when it is determined in S31 that the path calculation load is heavier and determined in S35 that the shortest path tree has not yet been calculated in the past.

After that, when the path setting request for the path from numeral 2 to numeral 6 is newly issued, and when it is determined that the path calculation load at this time is heavier, in the processing of S36 described above, the shortest path tree retaining section 225 acquires the shortest path tree that has already been calculated in the past.

Figure 6:
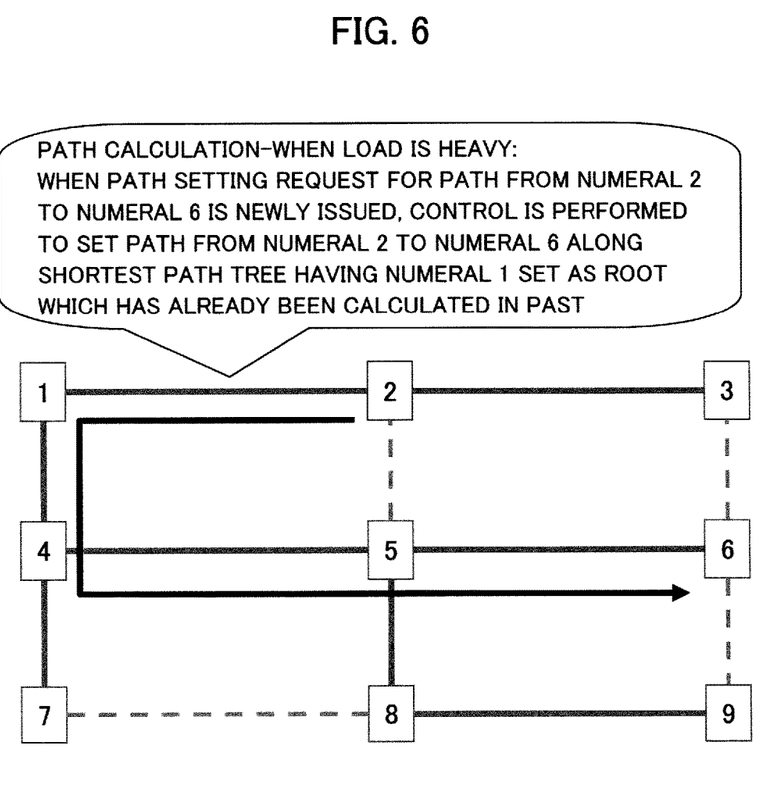
FIG. 6 is an explanatory diagram of path trees.

The shortest path tree that has already been calculated in the past, which is acquired here, includes the above-mentioned four candidates for the shortest path tree having numeral 1 set as the root. At this time, the path setting request is made for the path from numeral 2 to numeral 6, and hence the path tree including numerals 1, 4, 5, and 6 is obtained from among the four candidates for the shortest path tree. Then, the path setting control is performed to set a path to numeral 6 having numeral 2 set as the root along this path tree. As a result, as illustrated in FIG. 6, the path including numerals 2, 1, 4, 5, and 6 is set.

In the above-mentioned first path setting processing illustrated in FIG. 4, when it is determined that the path calculation load imposed on the controller 2 is heavier than the predetermined threshold value, for example, in response to the path setting request for the path from numeral 2 to numeral 6, it is determined whether or not the shortest path tree has already been calculated in the past. When it is determined that the shortest path tree has already been calculated in the past, the path setting control is performed based on the already-calculated shortest path tree. In other words, in a heavy load state of the path calculation, the shortest path tree calculated in the past is reused, to thereby accelerate the path setting processing.

Figure 7:
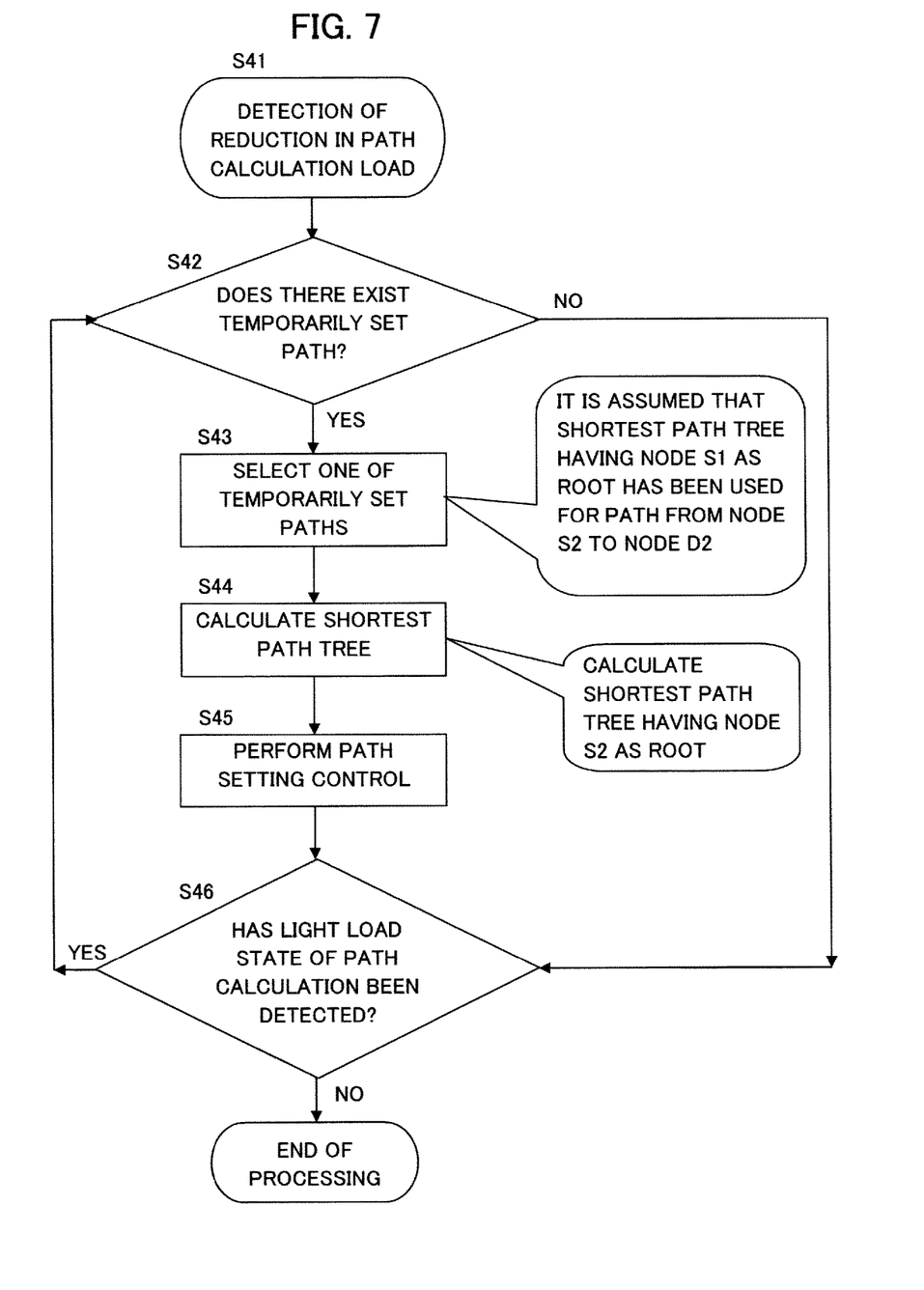
FIG. 7 is a flowchart illustrating a second path setting processing.

Next, in a second path setting processing illustrated in FIG. 7, when reduction in the path calculation load imposed on the controller 2 is detected, the path is set again to the shortest path based on the appropriate shortest path tree. In the second path setting processing, a roundabout path set temporarily (provisionally) is returned to the shortest path, which can enhance use efficiency of the communication network NW.

For details, By comparing the path calculation load with the predetermined threshold value based on the path calculation load information obtained by the path calculation load measurement section 223, the path calculation load determination section 227 detects the reduction in the path calculation load, in other words, a change from the heavy load state of the path calculation to a light load state (S41 in FIG. 7).

When notified of the change in the load state by the path calculation load determination section 227, the already-set path information retaining section 228 refers to the saved contents to determine whether or not there exists a path set temporarily based on the shortest path tree calculated in the past (S42 in FIG. 7).

When the already-set path information retaining section 228 determines "No", the processing is brought to an end. On the other hand, when the already-set path information retaining section 228 determines "Yes", the shortest path tree selection section 226 is launched.

The shortest path tree selection section 226 refers to the path information saved in the already-set path information retaining section 228 to select the shortest path tree corresponding to one of the temporarily set paths (S43 in FIG. 7). Here, it is assumed that, for example, the shortest path tree having the node S1 (corresponding to numeral 1 in FIG. 6) as the root has been used for the path from a node S2 to a node D2 (corresponding to the path from numeral 2 to numeral 6 in FIG. 6).

The shortest path calculation section 222 that has received a notification relating to the shortest path tree selected from the shortest path tree selection section 226 executes the path calculation for the temporarily set path, and obtains the appropriate shortest path tree having the node S2 as the root (S44 in FIG. 7). As a result of the path calculation, for example, the appropriate shortest path tree passing through numeral 5 in FIG. 6 with numeral 2 and numeral 6 set as the root and the leaf, respectively, is obtained.

The path setting section 224 controls the path setting based on the appropriate shortest path tree obtained by the shortest path calculation section 222. In other words, the path setting section 224 sets the path again by controlling the settings of the flow table 31 for each of the switches 3 corresponding to the shortest path from the node S2 to the node D2 based on the obtained shortest path tree (S45 in FIG. 7).

While the path calculation load determination section 227 is detecting (determining) the light load state of the path calculation, in other words, unless the path calculation load increases again, not the shortest path but the temporarily set paths are extracted sequentially, and processing for calculating the shortest path tree in order to perform the path setting control based on the shortest path is repeated for each of the extracted paths (S46 in FIG. 7).

(Determination Method for Path Calculation Load)

Next, a description is made of an embodiment of a determination method for the path calculation load which is carried out by the path calculation load determination section 227. In the above-mentioned first and second path setting processings, for example, based on an instruction issued previously by a network operator, the path calculation load determination section 227 carries out any one of first, second, and third determination methods for the path calculation load, which are described below, in cooperation with the path calculation load measurement section 223 as the need arises. In any one of those determination methods, the threshold value used for the determination can be determined as a given fixed value in advance, but may be dynamically changed depending on an operating situation or the like.

In the first determination method for the path calculation load carried out by the path calculation load determination section 227, the determination is performed based on a path calculation time period in the past (strictly, several times immediately before). In other words, the path calculation load measurement section 223 records a time at which the path setting request is issued and a time at which the path calculation is finished for each request, and calculates a time period required to finish the path calculation. In the path calculation load determination section 227, the heavy load state in which the path calculation load is heavy is determined when the time period required to finish the path calculation is equal to or larger than (or exceeds) a predetermined threshold value, while the light load state in which the path calculation load is light is determined when the time period is less than (or equal to or smaller than) the predetermined threshold value.

In the second determination method for the path calculation load carried out by the path calculation load determination section 227, the determination is performed based on a queue length. In other words, when the path setting request is received, the path setting request is stored in a queue (First in First out (FIFO)) (not shown) of the path setting request reception section 221. At this time, with a threshold value provided for the queue length, the heavy load state in which the path calculation load is heavy is determined when there exist unprocessed path setting requests whose number is equal to or larger than (or exceeds) the predetermined threshold value, while the light load state in which the path calculation load is light is determined when there exist unprocessed path setting requests whose number is less than (or equal to or smaller than) the predetermined threshold value.

In the third determination method for the path calculation load carried out by the path calculation load determination section 227, the determination is performed based on an activity ratio of the CPU 21. In other words, the path calculation load measurement section 223 monitors a CPU activity ratio by which the CPU 21 is used for the path calculation. In the path calculation load determination section 227, the heavy load state in which the path calculation load is heavy is determined when the CPU activity ratio is equal to or larger than (or exceeds) a predetermined threshold value, while the light load state in which the path calculation load is light is determined when the CPU activity ratio is less than (or equal to or smaller than) the predetermined threshold value.

(Selection Method for Shortest Path Tree)

Next, a description is made of an embodiment of a selection method for the shortest path tree calculated in the past which is carried out by the shortest path tree selection section 226. In the above-mentioned first and second path setting processings, for example, based on the instruction issued previously by the network operator, the shortest path tree selection section 226 carries out anyone of first, second, and third selection methods for the shortest path tree calculated in the past, which are described below.

In the first selection method for the shortest path tree carried out by the shortest path tree selection section 226, a result of the path calculation performed immediately before by the shortest path calculation section 222 is used. In other words, the shortest path tree selection section 226 selects the shortest path tree (including the shortest path tree candidate) which is obtained when the shortest path calculation section 222 last executes the path calculation and which is retained in the shortest path tree retaining section 225.

In the second selection method for the shortest path tree carried out by the shortest path tree selection section 226, results of the path calculation performed by the shortest path calculation section 222 a plurality of times are used. In other words, the shortest path tree selection section 226 selects one from among the plurality of shortest path trees (including the shortest path tree candidates) which are obtained when the path calculation is executed by the shortest path calculation section 222 a plurality of times and which are retained in the shortest path tree retaining section 225.

In the second selection method for the shortest path tree, some variations are conceivable as to how the plurality of shortest path trees are selected. First, it is possible to select the most recent n shortest path trees in the past. Second, it is possible to randomly select n shortest path trees from among the (n+1) shortest path trees being a sum of the n shortest path trees that are already candidates and the one shortest path tree obtained by newly performing the path calculation.

Third, it is conceivable to use a method in which a congestion situation of the network NW is considered when the plurality of shortest path trees are selected. In other words, it is possible to select n shortest path trees so as to use the path exhibiting less congestion from among the (n+1) shortest path trees being the sum of the n shortest path trees that are already candidates and the one shortest path tree obtained by newly performing the path calculation. In the determination of the congestion, a used bandwidth with respect to a link bandwidth of each link, in other words, a usage rate is obtained, and the congestion is determined based on whether or not the usage rate exceeds a threshold value. The selection of the candidates is performed by assuming that the shortest path trees having more links whose usage rate exceeds the threshold value are in a more intense congestion state.

In addition, in the second selection method for the shortest path tree, some variations are conceivable as to how one shortest path tree is selected from among the n shortest path trees. First, it is possible to randomly select one shortest path tree from among the n shortest path trees. Second, the path between a transmitting node and a destination node involved in the path setting request is obtained based on each of the shortest path tree candidates, and it is possible to select the path having the smallest number of hops.

In those methods of selecting one shortest path tree, a degree of congestion of the network NW is not taken into consideration. Examples of the method that takes the degree of congestion into consideration may include the above-mentioned methods used when the n shortest path trees are selected, in other words, a method of selecting the shortest path tree having the smallest number of links whose link usage rates exceed the threshold value. This can avoid the use of the link causing the congestion as much as possible.

Further, the examples may include a method of obtaining the path between the transmitting node and the destination node involved in the path setting request based on each of the shortest path trees being candidates, and selecting the shortest path tree having the smallest ratio of the links causing the congestion to all the links included in the path. In addition, with a congestion situation of the entire network set as a trigger, a path setting method that does not take the congestion into consideration and the path setting method that takes the congestion into consideration may be switched over to one another.

(Prioritized Processing Method for Path Setting Request)

The packet of the path setting request received by the path setting request reception section 221 of the controller 2 has a priority field. In the above-mentioned first path setting processing, the shortest path calculation section 222 may process the path setting request having a high priority from the queue of the path setting request reception section 221 based on the content of the priority field.

Effects of Embodiment

According to the disclosed centralized network control device, when a large number of path calculation requests are issued with the heavy path calculation load, by using (reusing) path information obtained in the past (including immediately before) instead of performing a large volume of path calculation, it is possible to suppress the delay time until the path is set, with the result that a packet loss that occurs before the path is set can be reduced.

Modified Example

The processing of the embodiment described above is provided as a computer-executable program, and can be provided by a non-transitory computer readable recording medium such as a CD-ROM or a flexible disk or via a communication line.

An arbitrary plurality of or all the processes of the embodiment described above can be selected and combined to be carried out.

What is claimed is:

1. A centralized network control device for controlling a plurality of network devices in a centralized manner, comprising a memory storing executable instructions; and a processor connected to the memory and configured to execute the instructions, execution of the instructions causing the processor to:
   determine a processor load of path calculation by the processor to calculate a path tree information based on a predetermined threshold value and the processor load of path calculation by the processor when a path setting request is received;
   perform, when a heavy load state of the path calculation by the processor is determined, setting control for a temporary path by using a path based on a path tree obtained by past path calculation execution; and
   perform, when the load state of the path calculation by the processor changes from the heavy load state to the light load state, the setting control for a change in the path from the temporarily set path to the path based on the shortest path tree obtained by the path calculation execution in response to the path setting request.

2. The centralized network control device according to claim 1, wherein the processor is further configured to perform, when a light load state of the path calculation is determined, the setting control for the path based on a shortest path tree obtained by path calculation execution in response to the path setting request.

3. The centralized network control device according to claim 2, wherein the path tree obtained by the past path calculation execution includes the shortest path tree and a shortest path tree candidate that are obtained by the path calculation execution in response to the path setting request and saved.

4. The centralized network control device according to claim 3, wherein the processor is further configured to select, in the heavy load state of the path calculation, the path tree obtained by the past path calculation execution from among the shortest path tree and the shortest path tree candidate that are saved.

5. The centralized network control device according to claim 1, wherein the processor is further configured to repeat the setting control for a change in the path while the load state of the path calculation keeps changing from the heavy load state to the light load state.

6. The centralized network control device according to claim 1, wherein a Dijkstra's algorithm is used in the path calculation execution in order to calculate the shortest path tree having a single starting point in which a transmission source node given along with the path setting request is set as a root of the path tree.

7. The centralized network control device according to claim 1, wherein the path setting request includes identification information on a transmission source node and identification information on a destination node.

8. The centralized network control device according to claim 1, wherein the centralized network control device is an OpenFlow controller and in accordance with an OpenFlow protocol, distributes a flow table in which a forwarding rule for a packet is described to a plurality of OpenFlow switches serving as the plurality of network devices to control the plurality of OpenFlow switches in a centralized manner.

9. The centralized network control device according to claim 8, wherein the flow table includes identification information on a transmission source node, identification information on a destination node, an input port number of each of the plurality of OpenFlow switches, and an output port number of each of the plurality of OpenFlow switches.

10. The centralized network control device according to claim 1, wherein the path tree information is calculated based on one of a time period required to finish the path calculation, a queue length stored as the path setting request and a processor activity ratio by which the processor is used for the path calculation.

11. A centralized network control method executed by a processor for controlling a plurality of network devices in a centralized manner, comprising:
   determining a processor load of path calculation by the processor to calculate a path tree information based on a predetermined threshold value and the processor load of path calculation by the processor when a path setting request is received;
   performing, when a heavy load state of the path calculation by the processor is determined, setting control for a temporary path by using a path based on a path tree obtained by past path calculation execution; and
   performing, when the load state of the path calculation by the processor changes from the heavy load state to the light load state, the setting control for a change in the path from the temporarily set path to the path based on the shortest path tree obtained by the path calculation execution in response to the path setting request.

12. The centralized network control method according to claim 11, further comprising performing, when a light load state of the path calculation is determined, the setting control for the path based on a shortest path tree obtained by path calculation execution in response to the path setting request.

13. The centralized network control method according to claim 12, wherein the path tree obtained by the past path calculation execution includes the shortest path tree and a shortest path tree candidate that are obtained by the path calculation execution in response to the path setting request and saved.

14. The centralized network control method according to claim 13, further comprising selecting, in the heavy load state of the path calculation, the path tree obtained by the past path calculation execution from among the shortest path tree and the shortest path tree candidate that are saved.

15. A non-transitory readable medium recorded with a program that causes a processor for controlling a plurality of network devices in a centralized manner to execute processing comprising:
   determining a processor load of path calculation by the processor to calculate a path tree information based on a predetermined threshold value and the processor load of path calculation by the processor when a path setting request is received;
   performing, when a heavy load state of the path calculation by the processor is determined, setting control for a temporary path by using a path based on a path tree obtained by past path calculation execution; and
   performing, when the load state of the path calculation by the processor changes from the heavy load state to the light load state, the setting control for a change in the path from the temporarily set path to the path based on the shortest path tree obtained by the path calculation execution in response to the path setting request.

16. The non-transitory readable medium according to claim 15, further comprising performing, when a light load state of the path calculation is determined, the setting control for the path based on a shortest path tree obtained by path calculation execution in response to the path setting request.

17. The non-transitory readable medium according to claim 16, wherein the path tree obtained by the past path calculation execution includes the shortest path tree and a shortest path tree candidate that are obtained by the path calculation execution in response to the path setting request and saved.

18. The non-transitory readable medium according to claim 17, further comprising selecting, in the heavy load state of the path calculation, the path tree obtained by the past path calculation execution from among the shortest path tree and the shortest path tree candidate that are saved.

19. A centralized network control device for controlling a plurality of network devices in a centralized manner, comprising a memory storing executable instructions; and a processor connected to the memory and configured to execute the instructions, execution of the instructions causes the processor to:
   determine a processor load of path calculation by the processor to calculate a path tree information based on a predetermined threshold value and the processor load of path calculation by the processor when a path setting request is received;
   perform, when a heavy load state of the path calculation by the processor is determined, setting control for a temporary path by using a path based on a path tree obtained by past path calculation execution; and perform, when the load state of the path calculation by the processor changes from the heavy load state to the light load state, the setting control for a change in the path from the temporarily set path to the path based on the shortest path tree obtained by the path calculation execution in response to the path setting request.

* * * * *